Jan. 1, 1929.
P. W. SULLIVAN
1,697,517
DOOR CONSTRUCTION
Filed June 27, 1927 4 Sheets-Sheet 1
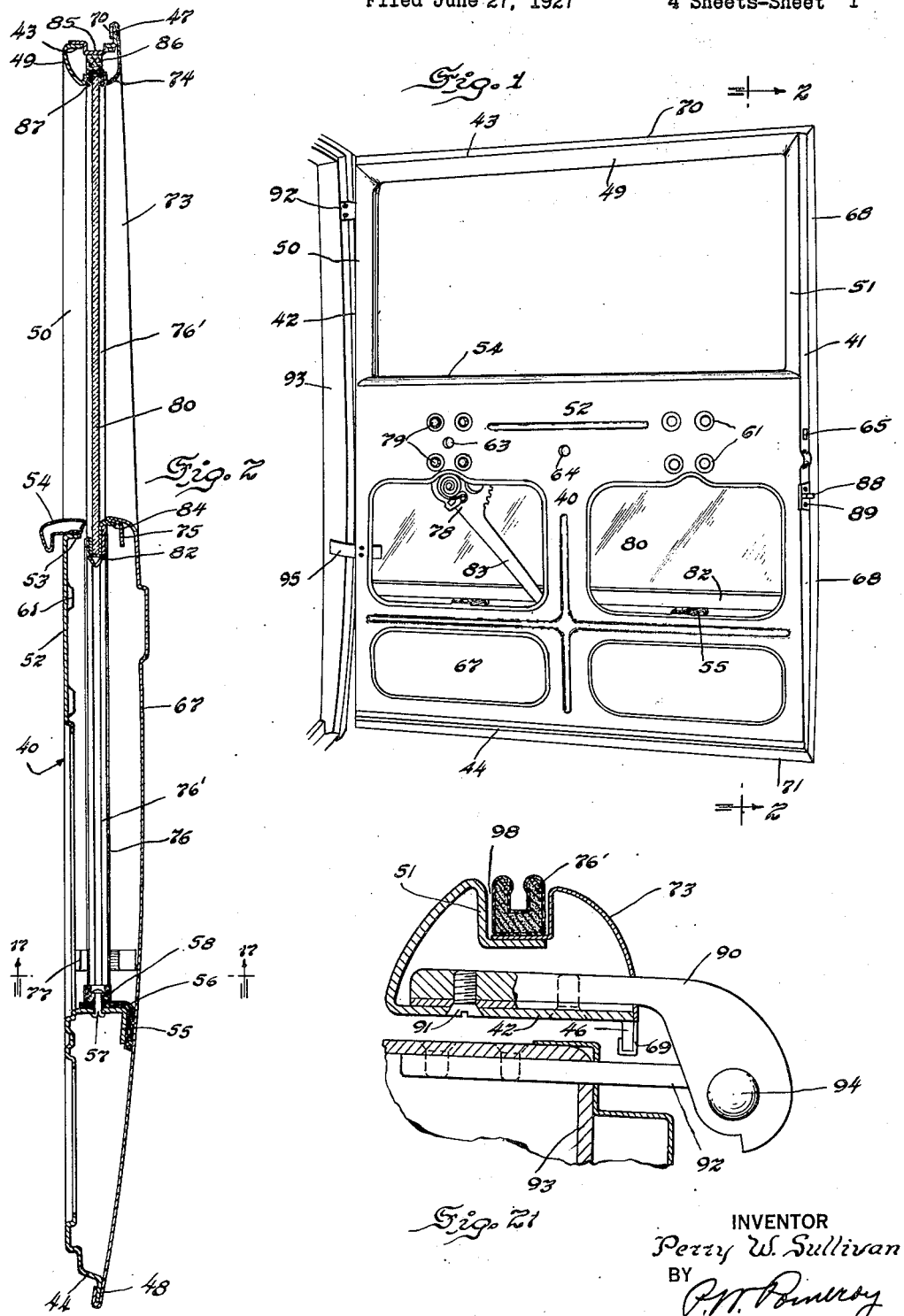
INVENTOR
Perry W. Sullivan
BY
ATTORNEY Jan. 1, 1929.  
P. W. SULLIVAN  
1,697,517  
DOOR CONSTRUCTION  
Filed June 27, 1927 4 Sheets-Sheet 2
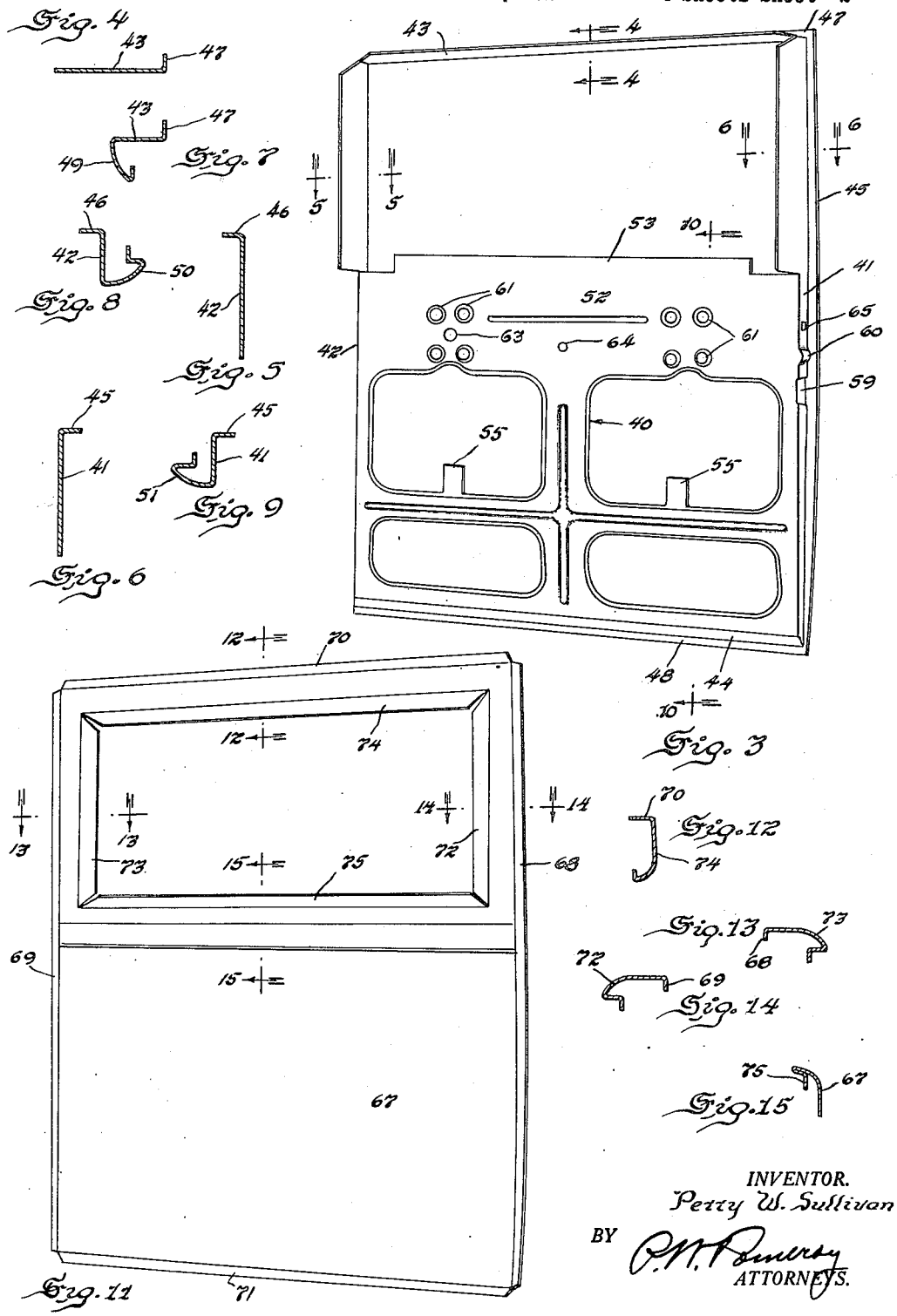
INVENTOR.
Perry W. Sullivan
BY
ATTORNEYS.

Jan. 1, 1929.
P. W. SULLIVAN
1,697,517
DOOR CONSTRUCTION
Filed June 27, 1927     4 Sheets-Sheet 3
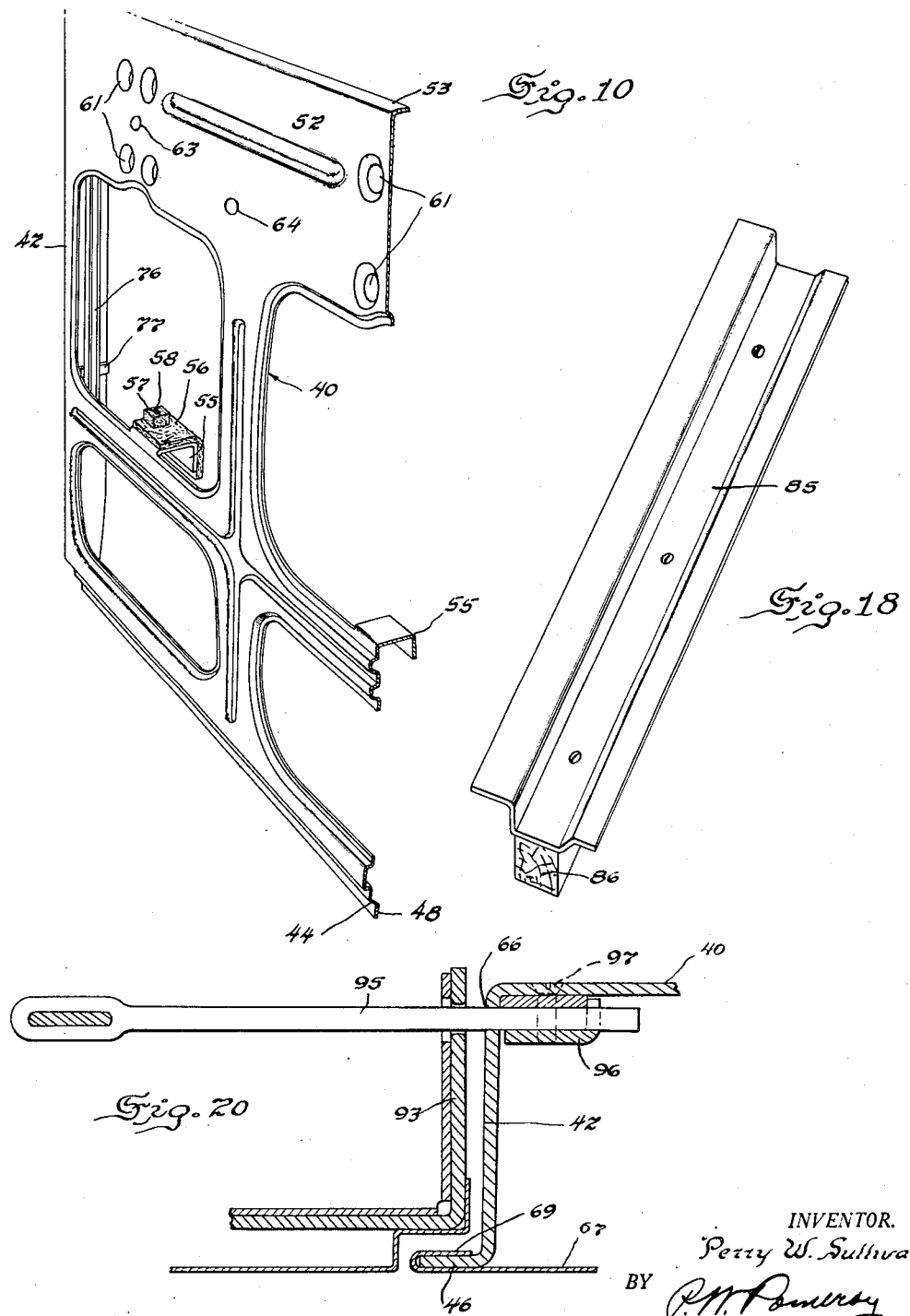
INVENTOR.
Perry W. Sullivan.
BY
ATTORNEYS.

Jan. 1, 1929.
P. W. SULLIVAN
DOOR CONSTRUCTION
Filed June 27, 1927    4 Sheets-Sheet 4
1,697,517
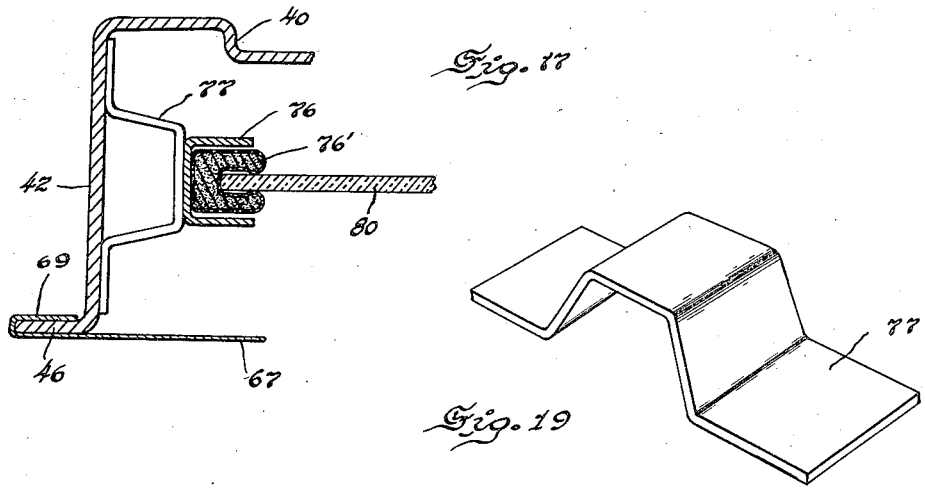
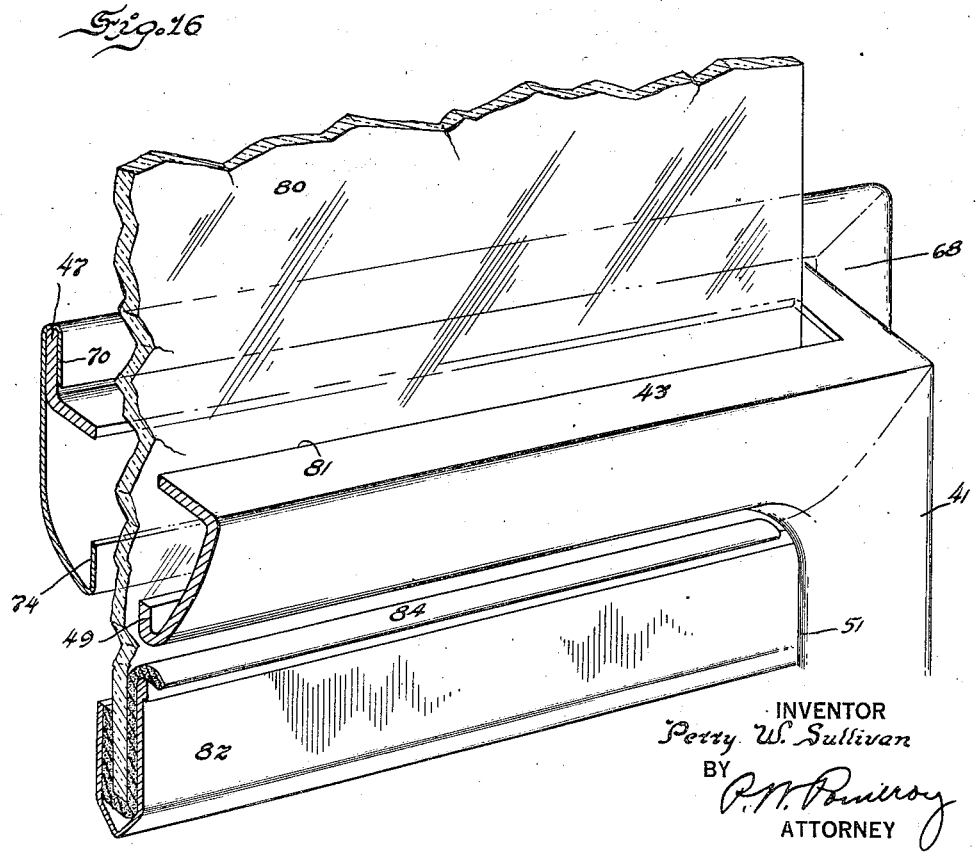
INVENTOR
Perry W. Sullivan
BY
ATTORNEY Patented Jan. 1, 1929.

1,697,517

UNITED STATES PATENT OFFICE.

PERRY W. SULLIVAN, OF SOUTH BEND, INDIANA, ASSIGNOR TO THE STUDEBAKER CORPORATION, OF SOUTH BEND, INDIANA, A CORPORATION OF NEW JERSEY.

DOOR CONSTRUCTION.

Application filed June 27, 1927. Serial No. 201,623.

This invention relates to vehicle bodies and particularly to doors employed in bodies of the closed type, the principal object being to provide a new and novel construction fabricated from sheet metal, which construction is composed of a less number of parts than door constructions used heretofore.

Another object is to provide a vehicle door which is constructed of only two sheet metal panels secured together at their outer edges.

Another object is to provide a vehicle door with a one-piece sheet metal facing panel and a one-piece sheet metal frame panel spaced therefrom, the edges of the facing panel being flanged over the edges of the inner panel to secure the same together.

Another object is to provide a vehicle door with a sheet metal outer panel and a sheet metal inner panel spaced therefrom, the inner panel being of heavier gauge than the outer panel and being Z-shaped at its marginal edges to form an integral frame for the door.

Another object is to provide a vehicle door constructed of spaced sheet metal inner and outer panels with a window frame formed solely by the edges of the window openings in both panels.

Another object is to provide a vehicle door constructed of sheet metal inner and outer panels secured together at their marginal edges and having a lock board formed integrally with the inner panel.

Another object is to provide a vehicle door constructed of spaced sheet metal inner and outer panels with a sound-deadening means for the outer panel comprising an inverted U-shaped portion formed integrally with the inner panel and felt strips between the outer legs of the U-shaped portions and the outer panel.

A further object is to provide a vehicle door which may be interchangeably used for the left side of a vehicle body as well as for the right side thereof.

These being among the objects of the present invention, the same consists of certain features of construction and combinations of parts to be hereinafter described with reference to the accompanying drawings and then claimed, having the above and other objects in view.

In the accompanying drawings which illustrate a suitable embodiment of the present invention, Figure 1 is a perspective assembly view of a vehicle door constructed entirely of sheet metal.

Figure 2 is an enlarged section taken approximately on the line 2—2 of Figure 1.

Figure 3 is a perspective view of the frame panel after it has been stamped to shape, but before the window frame therefor has been bent to finished shape.

Figure 4 is a section taken on the line 4—4 of Figure 3.

Figure 5 is a section taken on the line 5—5 of Figure 3.

Figure 6 is a section taken on the line 6—6 of Figure 3.

Figure 7 is a section taken substantially the same as Figure 4, but showing the upper edge of the window frame bent to shape.

Figure 8 is a section taken substantially the same as Figure 5, but showing one of the sides of the window frame bent to shape.

Figure 9 is a section taken substantially the same as Figure 6, but showing the other side of the window frame bent to shape.

Figure 10 is an enlarged perspective view of the door frame taken on the line 10—10 of Figure 3.

Figure 11 is a perspective view of the outer facing panel.

Figure 12 is a section taken on the line 12—12 of Figure 11, showing the shape of the top edge of the window frame.

Figure 13 is a section taken on the line 13—13 of Figure 11, showing the shape of the left side of the window frame.

Figure 14 is a section taken on the line 14—14 of Figure 11, showing the shape of the right side of the window frame.

Figure 15 is a section taken on the line 15—15 of Figure 11, showing the shape of the lower edge of the window frame.

Figure 16 is a transverse perspective view showing how the window glass is inserted through the top of the door.

Figure 17 is a section taken on the line 17—17 of Figure 2.

Figure 18 is a perspective view of the door header bar.

Figure 19 is a perspective view of the window channel support.

Figure 20 is a section taken through the door and the body pillar showing the door check construction.

Figure 21 is a section taken through the door and the body pillar showing one of the door hinges.

Referring to the accompanying drawings, in which like numerals refer to like parts throughout the several views, and particularly to Figures 1 and 3, the frame for the door consists of a single sheet metal panel. In forming the panel, it is first stamped to the shape shown in Figure 3, comprising a main body portion 40 having vertical side faces 41 and 42 and horizontal top and bottom faces 43 and 44 substantially perpendicular thereto. The marginal edges of the faces 41, 42, 43 and 44 are bent at right angles to provide the flanges 45, 46, 47 and 48, respectively, which are for a purpose to be later described. The cross sectional shape of that portion of the face 43 and flange 47 above the window opening is shown in Figure 4, and the cross sectional shape of the sides of the window opening is shown in Figures 5 and 6. One side of the window frame is then formed by bending a portion of the top face 43 downwardly and then abruptly upwardly parallel to the main body portion 40 to provide the window frame top rail 49, as shown in cross section in Figure 7, and by bending portions of the side faces 41 and 42 inwardly, then abruptly outwardly toward the main portion of the faces 41 and 42, and then flanging the edges thereof so that they are parallel to the faces 41 and 42 to provide the window frame side rails 50 and 51, as shown in cross section in Figures 8 and 9, respectively. The juncture between the ends of the top rail 49 and the side rails 50 and 51 may be welded, if desired, to provide a neat appearance and to give added strength to the door structure. Portions may be cut out of the main surface 40 of the frame panel to decrease the weight of the same. It is, however, essential that integral, central, horizontal and vertical portions be retained to act as reinforcing portions.

The lock board 52, upon which the window regulator and door latch are mounted, is an integral part of the main body portion 40 of the frame panel and the upper edge thereof is flanged over perpendicular thereto to provide an attaching surface 53 for the door garnish moulding 54, which is secured thereto after the door is assembled.

The upwardly projecting flanges 55 of the horizontal reinforcing portions of the main body 40 are bent horizontally and then downwardly parallel to the body portion 40, as shown in Figures 2 and 10, and secured to the horizontal and vertical faces of each flange is a strip of felt 56 or similar material held in position by a rivet 57 clinched to the horizontal face and extending through a rubber bumper 58, the purpose of which will be described later.

The frame may be used for doors on either side of a vehicle body and thereby eliminates the necessity of carrying right and left door frames in stock. The frame shown in Figure 3 is for the right side of a vehicle body and the only change necessary to adapt the same for the left side is to form the depression 59 for the door dovetail and the projection 60 for the door latch bolt rod in the face 42 thereof instead of in the face 41 as shown.

Depressions 61 are formed at both ends of the lock board 52 and the bolts which secure the window regulator thereto are received in either of the sets of depressions 61 at the left end of the lock board 52 or those at the right end, depending on whether the door is for the right or left side of a vehicle body. An opening 63 is provided in the lock board 52 for the shaft of the window regulator and another opening 64 is formed at the middle of the lock board 52 for the door latch operating shaft. A rectangular opening 65 is formed in the face 41 of the panel through which the door latch bolt projects when assembled. Similarly, an opening 66 is cut in the opposite face 42 of the frame panel for the door check strap.

The outer panel, or facing 67 which is seen from the outside of the body when the door is in closed position is, as shown in Figure 11, stamped from a single sheet of metal of somewhat lighter gauge than the frame panel because it is not subjected to any great amount of stress. This facing panel 67 is shaped to the proper contour and the four marginal edges 68, 69, 70 and 71 are flanged over perpendicular to the main surface thereof and the vertical edges 72 and 73 of the window opening are bent inwardly, then bent abruptly rearwardly to present a surface parallel to the main surface and are finally bent inwardly at right angles to present vertical flanges perpendicular to the plane of the main surface, as shown in Figures 14 and 13, respectively. The upper horizontal edge 74 is bent inwardly and then upwardly to present a surface parallel to the plane of the main surface of the panel 67, as shown in Figure 12. The lower horizontal edge 75 of the window opening is curved inwardly, then bent back upon itself and finally bent downwardly, as shown in Figure 15.

The vertical and horizontal inside distances between the flanged edges 68, 69, 70 and 71 of the facing panel 67 are sufficiently greater than the corresponding outside dimensions of the frame panel so that when the panel 67 receives the door frame panel the flanges 68, 69, 70 and 71 may be clinched over the flanges 45, 46, 47 and 48, respectively, to firmly secure the facing panel 67 to the frame panel.

When the two panels are united in this manner, the flanges at the marginal edges of the vertical sides 72 and 73 of the facing panel 67 abut against the marginal flanges of the window side rails 50 and 51 and are welded together so that the combination thereof provides oppositely disposed rectangular shaped grooves 98 at each side of the window opening. These grooves 98 receive and have secured at their extreme lower ends the upper portions of the window guide channels 76 to effect continuations thereof, the lower portions of the guide channels 76 being secured to supports 77 welded to the inner sides of the frame panel faces 41 and 42, as shown in Figure 17, one of these supports also being shown in perspective in Figure 19. The felt window run 76' is secured within the grooves 98.

The facing panel 67 firmly bears against the felt strips 56 which are secured to the bent over portion 55 of the main body portion 40 of the frame panel so that the strips 56 act as sound deadening devices to prevent flexing of the panel 67 to thereby eliminate the drumming or rumbling sound so often heard in doors which are constructed entirely of sheet metal.

The frame panel with the facing panel 67 secured thereto is now ready to have the various accessory parts assembled. The window regulator 78 is inserted in the space between the frame panel and the outer panel 67 and secured to the lock board 52 by the bolts 79, the heads of which seat in one of the sets of depressions 61 as seen in Figure 1. The window glass 80 is then assembled by dropping the same through a slot 81 formed in the upper frame panel face 43 until the vertical edges thereof are received by the felt window runs 76' secured in the troughs 98 formed by the vertical window frame sides. When the window glass 80 is completely lowered, the channel 82 at the bottom edge thereof, which is the bearing surface for the window regulator arm 83, seats on the rubber bumper blocks 58 carried by the integral frame portions 55, which prevents the glass 80 from rattling. In raised position, as shown in Figure 2, the weather strip 84 attached to the glass 80, seats against the inwardly projecting portion of the lower horizontal edge 75 of the window opening formed in the panel 67 to exclude rain and the like. A removable header bar 85, shown in perspective in Figure 18, having a wooden tacking strip 86 secured thereto is secured to the top face 43 of the door frame to cover the slot 81, one edge of the bar 85 being positioned above the top face 43 and the other edge being positioned below the top face as shown in Figure 2. A felt window channel 87 is secured to the tacking strip 86 and is positioned in the space between the flanged edges of the upper horizontal window frame portions of the frame panel and the facing panel 67 to receive the upper edge of the window glass 80, as seen in Figure 2. When it is desired to remove the window glass 80, the header bar 85 with its attached ports 86 and 87 is removed and the glass 80 may be lifted out in the same manner in which it is inserted. The door garnish moulding 54 is then suitably secured to the flange 53 of the door lock board 52.

The door latch, though not shown, is secured to the lock board 52 with its latch bolt slidably received in the latch bolt opening 65 formed in the side face 41 of the door frame panel. The door dovetail 88 is seated in its depression 59 and is secured therein by screws 89.

Suitable slots, as seen in Figure 21, are formed at one side of the panel 67 so that the door portions 90 of the hinges can be inserted therethrough and secured to the frame panel face 42 by screws 91 extending through the face 42 and threaded into the door hinge portions 90. The body portions 92 of the hinges are secured to the body pillar 93 and then the completed door is hung on the body pillar 93 by pins 94 which unite the two hinged portions 90 and 92.

The door check strap 95, as shown in Figure 20, slidably extends through the body pillar 93 and is secured to the inner face of the main body portion 40 of the door frame panel by a clamp 96 and a screw 97 projecting through the metal of the frame and threaded into the clamp 96. Suitable upholstery material may be assembled to the exposed surface of the door frame to give a neat and pleasing appearance.

The foregoing description has covered the construction of the door from the formation of the door frame to the assembly of its parts. It can be seen that there are many features incorporated therein which are new to the art. In the first place, the door is constructed of only two sheet metal panels, each of which is formed to shape from a single stamping and having integral window frame portions. One particular feature of the frame panel is that it is formed with an integral lock board 52 for the window regulator and door latch and is also formed with integral supports 55 for the window glass 80 when it is in lowered position.

Another feature is that the supports 55 when covered with felt as seen in Figure 2, provide means for preventing rumbling or drumming of the facing panel 67.

It can also be seen that the door is interchangeable and can with little difficulty be used for the left as well as the right side of the vehicle body.

The door, as explained, is constructed with the least number of parts possible and, therefore, is economical to manufacture, especially in quantity production, as many machining operations are eliminated and considerable time is saved in the assembly operations.

Formal changes may be made in the specific embodiment of the invention described without departing from the spirit and substance of the broad invention, the scope of which is commensurate with the appended claims.

What I claim is:—

1. A vehicle door comprising a frame panel having a window opening therein, integral side and end faces perpendicular to the main surface thereof, and integral flanges perpendicular to the outer surfaces of said faces, the metal of said frame panel at the sides of said window opening being bent inwardly and then perpendicularly to said side faces to form an abutment face, and a facing panel for said door having a window opening therein in matching relation with said opening in said frame panel provided with inturned marginal edges secured to the flanges on said frame panel, the metal of said facing panel at the sides of said window opening being bent inwardly and then parallel to the abutment face on said frame member to provide with said abutment face a channel for receiving a window.

2. A vehicle door comprising a sheet metal frame panel having a window opening therein, integral side and end faces perpendicular to the main surface thereof, and flanges perpendicular to said side and end faces, the metal of said panel at the sides of said window opening being bent inwardly and then perpendicularly to said faces and then inwardly parallel to said side faces to form abutment flanges, and a facing panel for said frame panel having a window opening in matching relation to said opening in said frame panel provided with inturned marginal edges secured to said flanges of said frame panel, the metal of said facing member at the sides of said window opening in said facing panel being bent inwardly, then perpendicularly to, and then parallel with the abutment flanges of said frame member to form abutment flanges, said abutment flanges of said facing panel being secured to said abutment flanges of said frame panel to provide rectangular channels for receiving a window.

3. A vehicle door comprising a panel having a window opening therein, integral side and end faces perpendicular to the main surface thereof, and integral flanges perpendicular to said side and end faces, the metal of said panel at the top of said window opening being bent inwardly and then upwardly parallel to the main portion of said frame panel to provide a window rail, and a facing panel having a window opening in matching relation to said opening in said frame panel having inturned marginal edges clinched over said flanges of said frame panel to secure said facing panel to said frame panel, the metal of said facing panel at the top of said window opening being bent inwardly and then upwardly parallel to the surface of said facing panel to provide a window rail parallel to and spaced from said window rail of said frame panel whereby a window glass may be assembled to said door in the space between said rails.

4. A vehicle door comprising a frame panel having a window opening therein, integral side and end faces substantially perpendicular to the main surface thereof, and integral flanges perpendicular to said faces, a facing panel for said door having inturned marginal edges secured to said flanges of said frame panel and inturned edges forming a finish around said window opening in spaced relation to said frame panel, the upper end face of said frame panel having a slot formed therein substantially the full length thereof to allow a window to be assembled to said door in the space between said facing panel and said frame panel, and a door header bar secured to said upper end face for normally concealing said slot.

5. A vehicle door comprising a panel member forming a frame having integral side and end faces perpendicular to the main surface thereof and integral flanges perpendicular to said faces, said frame panel being formed to provide integral reinforcing portions horizontally and vertically thereof, a facing panel for said frame secured to the inner surfaces of said frame panel flanges in spaced relation to the main surface of said frame panel, a vertically movable window between said frame and facing panels, and means for supporting said window in normal lowered position consisting of horizontal members formed integral with said horizontal reinforcing portion of said frame panel, and cushioning members secured to said horizontal members engageable with the lower horizontal edge of said window.

6. A vehicle door comprising a panel member forming a frame having integral side and end faces perpendicular to the main surface thereof and integral flanges perpendicular to said faces, said frame panel being formed to provide integral reinforcing portions horizontally and vertically thereof, a facing panel secured to said frame panel flanges and held in spaced relation to the main surface of said frame panel by said side and end faces, bracket members between said frame and facing panels formed integral with said reinforcing portions of said frame panel, and fibrous material interposed between said brackets and the main surface of said facing panel to hold the central portions of said facing panel against flexing movement to prevent drumming of the same.

7. A vehicle door comprising a frame panel having a window opening therein and side and end faces substantially perpendicular to the main surface thereof, and a face panel having a window opening therein in matched relation with said opening in said frame panel, and having certain edges of the metal surrounding said window opening bent inwardly, then parallel with the main surface of said facing panel, and finally flanged in a plane perpendicular to said main surface to respectively provide the sole abutment faces for one side and the marginal edges of a window, the marginal edges of said facing panel being secured to the marginal edges of said side and end faces of said frame panel.

Signed by me at South Bend, Indiana, this 23rd day of June, 1927.

PERRY W. SULLIVAN.